US012649645B2

(12) United States Patent
Stam

(10) Patent No.: US 12,649,645 B2
(45) Date of Patent: Jun. 9, 2026

(54) LIFTING SYSTEM

(71) Applicant: TATA STEEL IJMUIDEN B.V.,
Velsen-Noord (NL)

(72) Inventor: Peter Stam, Obdam (NL)

(73) Assignee: TATA STEEL IJMUIDEN B.V.,
Velsen-Noord (NL)

( * ) Notice: Subject to any disclaimer, the term of this
patent is extended or adjusted under 35
U.S.C. 154(b) by 945 days.

(21) Appl. No.: 17/760,449

(22) PCT Filed: Dec. 15, 2020

(86) PCT No.: PCT/EP2020/086284
§ 371 (c)(1),
(2) Date: Aug. 9, 2022

(87) PCT Pub. No.: WO2021/160324
PCT Pub. Date: Aug. 19, 2021

(65) Prior Publication Data
US 2023/0085108 A1 Mar. 16, 2023

(30) Foreign Application Priority Data

Feb. 11, 2020 (EP) ..................................... 20156676

(51) Int. Cl.
*B66C 1/34* (2006.01)
*B66C 15/06* (2006.01)
(Continued)

(52) U.S. Cl.
CPC .............. *B66C 15/065* (2013.01); *B66C 1/34*
(2013.01); *G01B 7/31* (2013.01); *G01D 5/145*
(2013.01); *B66C 17/10* (2013.01)

(58) Field of Classification Search
CPC ......... B66C 15/06; B66C 15/065; B66C 1/34;
B66C 1/40; B66C 17/10; G01B 7/31;
G01D 5/145; Y02P 10/20
See application file for complete search history.

(56) References Cited

U.S. PATENT DOCUMENTS

| | | | | |
|---|---|---|---|---|
| 8,905,250 | B2 * | 12/2014 | Stander ................... | B66C 23/88 |
| | | | | 212/281 |
| 10,155,645 | B2 * | 12/2018 | Silvo ....................... | G01N 27/83 |
| 2022/0274810 | A1 * | 9/2022 | Mathys ................... | B66C 13/48 |

FOREIGN PATENT DOCUMENTS

| | | |
|---|---|---|
| DE | 102013017803 A1 | 4/2015 |
| DE | 102013017803 B4 | 1/2017 |
| GB | 2000870 A | 1/1979 |

OTHER PUBLICATIONS

Written Opinion of the International Searching Authority and International Search Report for corresponding PCT Application No. PCT/EP2020/086284 filed Dec. 15, 2020.

* cited by examiner

*Primary Examiner* — Sang K Kim
(74) *Attorney, Agent, or Firm* — Vorys, Sater, Seymour and Pease LLP; Maryellen Feehery Hank; Anthony P. Venturino

(57) ABSTRACT

A lifting system for a metallurgical plant including an object with one or more trunnions and a lifting device with one or more lifting hooks for receiving the trunnions, wherein the lifting system further includes a detection system, the detection system includes a receiver, a sensor, a magnet and a transmitter, and wherein the magnet and the sensor are aligned upon correct alignment of at least one lifting hook and one trunnion such that a signal is submitted to the receiver.

17 Claims, 1 Drawing Sheet

(51) Int. Cl.
*G01B 7/31* (2006.01)
*G01D 5/14* (2006.01)
*B66C 17/10* (2006.01)

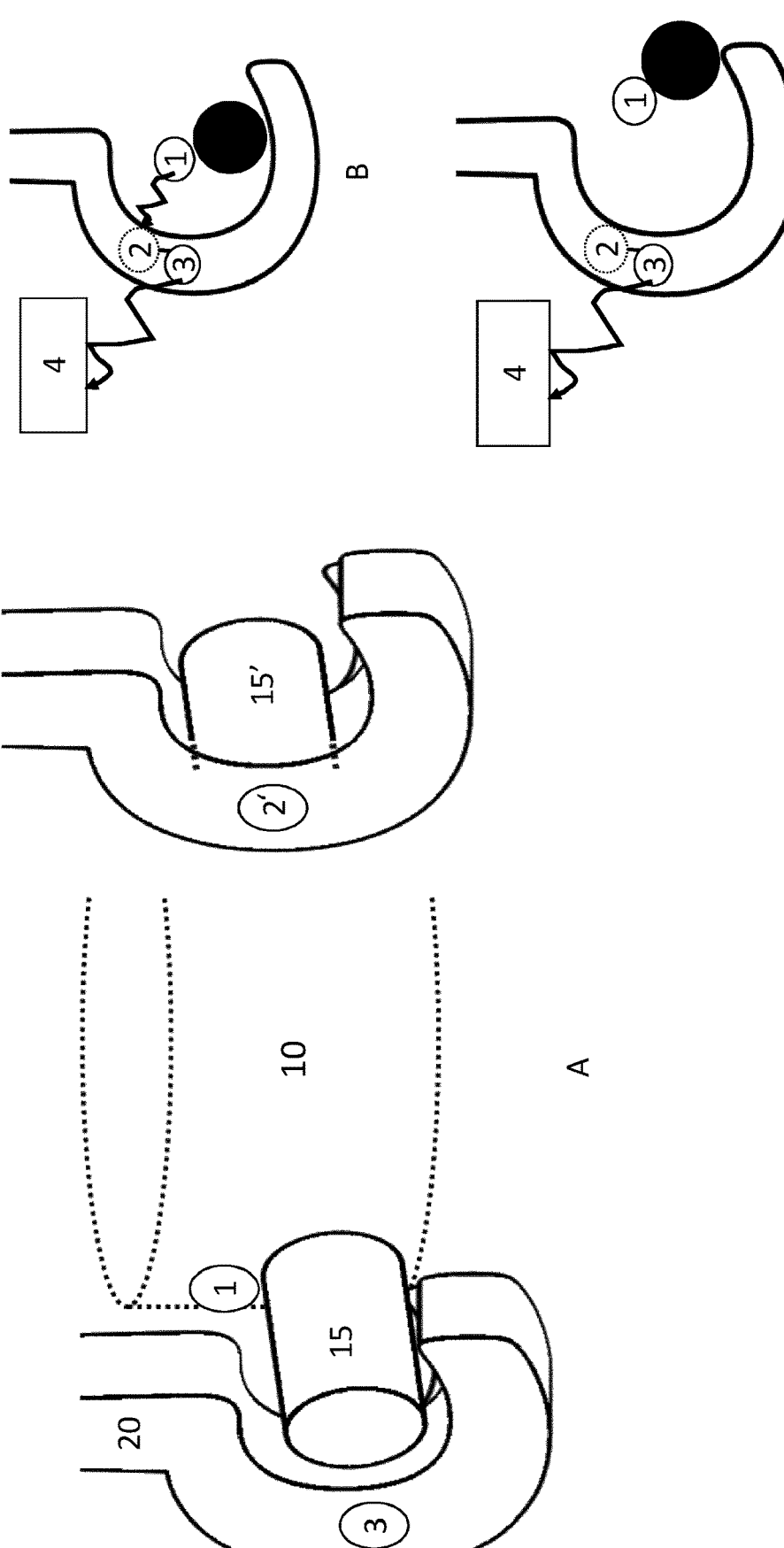

LIFTING SYSTEM

FIELD OF THE INVENTION

The present invention relates to a lifting system for a metallurgical plant. It further relates to a detection system.

BACKGROUND OF THE INVENTION

Lifting systems are an integral part in a metallurgical plant. In the basic oxygen furnace (BOF) process, lifting and transport of hot metal ladles may occur hundreds of time. During this discontinuous process the hot metal is subjected to a pre-treatment, a primary metallurgical treatment, a secondary metallurgical treatment and casted. All these steps required the lifting and transport of the hot metal in ladles by a crane. In addition, the scrap chutes are also handled by crane. For the safety and continuity of the steel works, it is crucial that the crane and ladles are properly aligned during lifting and transporting. The crane-operator has to ensure that the hooks of the crane are properly arranged around the lugs of the ladle before lifting. Some major accidents have happened in the steel industry as a result of badly aligned lifting systems.

In order to reduce human error leading to misalignment and casualties, a detection system for the correct alignment of the crane and ladle is desirable. Due to the harsh conditions in the BOF plant, including elevated temperatures and a dusty environment, the robustness of the detection system is crucial.

DE102013017803B4 discloses a misalignment system for a crane having two hooks connected via a crossbeam, the hooks being designed to receive a component, and the misreading system being a magnetic flux introduction device, a magnetic flux detection device and an electronic device connectable to the magnetic flux detection device, for detecting the magnetic flux detected at the magnetic flux detecting device.

The device of DE102013017803B4 is a complex device requiring multiple components. It will require a wired connection between the object to be lifted and the crane. In addition, it will be unclear which side of the object is misaligned in the device of the prior art.

It is therefore desirable to provide a lifting device that can detect the alignment of the crane and the object to be lifted without the need for complex wired components.

It is thus an object of this invention to provide a lifting device with a robust detection system.

The object is solved by the subject matter of the independent claim. Advantageous embodiments are given in the dependent claims and the description.

SUMMARY OF THE INVENTION

In a first aspect of the invention there is provided a lifting system for a metallurgical plant comprising an object with one or more trunnions and a lifting device with one or more lifting hooks for receiving the trunnions, wherein the lifting system further comprises a detection system, the detection system comprising a receiver unit, a sensor unit, a magnet and a transmitter unit, wherein the magnet and the sensor unit are aligned upon correct alignment of the lifting hook and the trunnion such that a signal is submitted to the receiver unit.

Advantageously, the detection system is configured such that the sensor unit will detect a change in the magnetic field due to the correct alignment of the object and the lifting device. By placing a sensor unit in the hook and a magnet on the object, or vice versa, the magnet and the sensor unit align when the trunnion and lifting hook are correctly engaged. The sensor unit will detect a change in the magnetic field and triggers the transmitter unit to send a signal to the receiver unit, typically located in the crane control system, such that the control system will know that the hooks are properly hooked in. The detection system thus provides information to the control unit, for example a Boolean true false result which can easily be interpreted by a control unit. This can result in a warning at the human machine interface (HMI) for the operator or could be used directly to disable hoisting in an unsafe situation.

The present invention thus provides a lifting device with a robust and simple detection system. The object is not particularly limited, and may be any container that needs to be lifted, for example a hot metal ladle or a scrap chute. The lifting device is typically an overhead travelling crane.

The magnet, sensor unit and transmitter unit are not particularly limited, but should preferably be able to withstand harsh conditions common in a metallurgical plant, such as elevated temperatures, dusty environment and shock impact. The sensor unit may comprise a hall effect sensor or a reed switch. The sensor unit and transmitter unit are preferably operating on a battery, such that the system does not require a power cable.

In an embodiment of the invention the magnet is a permanent magnet, such that it creates its own persistent magnetic field. This is preferred as no electrical current is needed to operate the magnet.

The strength of the magnet and the sensitivity of the sensor unit both determine the distance wherein a signal will be submitted. In an embodiment according to the invention, the magnet has a remanence of at least 3000 Gauss. At a remanence of at least 3000 Gauss, the sensor unit can be activated at a minimum distance of 0 mm and a maximum distance of 500 mm and will be deactivated when the magnet and sensor unit are more than 100 mm misaligned. In this range there is sufficient room to mount the sensor unit and transmitter unit on the hook and the magnet on the object while maintaining a good threshold for the sensor unit.

In an embodiment according to the invention, the distance between the magnet and sensor unit upon correct alignment is at most 200 mm. At a distance over 200 mm the size and/or the remanence of the magnet needs to be increased, which makes the placement of the magnet more difficult and will result in a system which is less accurate.

In an embodiment according to the invention, the threshold for a submission of the signal to the receiver unit is at least 3 milliTesla Below 3 milliTesla, the fitting of the magnet, sensor unit and transmitter unit to the object and lifting device becomes less practical as they need to be placed closer to the location where the hook and trunnion engage. In addition, this will increase the shock load implied on the detection system, which might result in damage to the system.

The configuration of the elements of the detection system is not particularly limited. Preferably the magnet is located at the outer side of the object. This ensures that the magnet has no direct contact with the material in the object. Preferably the magnet is located adjacent to the trunnion of the object, as this location is in close proximity of the interaction point of the trunnion and the hook.

When handling hot metal, the outer side of a ladle may reach temperatures up to 200° C., and the hook may reach temperatures up to 70° C. Therefore, the magnet is preferably located at the object and the sensor unit and transmitter unit are preferably located at the hook, as a magnet can withstand higher temperatures than a sensor unit and a transmitter unit.

In a preferred embodiment, the sensor unit is arranged at the inner side of the hook and the transmitter unit is arranged at the outer side of the hook. The inner side of the hook is defined as the side of the hook being closest to the object. The transmitter unit and sensor unit may be coupled via a cable, through a canal in the hook to transfer the signal. As transmitter units are generally more sensitive than sensor units, the transmitter unit is preferably placed at the outer side of the hook, which will have a lower operating temperature and less shock impact, and hence improves the durability of the detection system.

In a preferred embodiment, the lifting system comprises a sensor unit, a transmitter unit and a magnet for each trunnion/hook pair. In this way, no visual inspection is needed at all from an operator to check correct engagement of the hooks 30 and trunnion.

In a preferred embodiment each sensor unit comprises at least one hall sensor. A hall sensor can be unipolar which provides additional flexibility for mounting the magnet to the object. In addition, hall sensors can reach a high sensitivity and can be used at operating temperatures up to 150° C.

In a preferred embodiment each sensor unit comprises at least two sensors, the transmitter unit comprises at least two transmitters and the receiver unit comprises at least two receivers. Both at the transmitter unit and the receiver unit the signal is compared. If a signal is only received by one of the transmitters and/or receivers, the system will be able to provide a warning. By using such a lay out, the detection system is failsafe, making the system extra robust.

In an embodiment the transmitter unit and receiver unit are wirelessly connected. The signal are preferably submitted via radio waves, e.g. wlan, such that a cable between the transmitter unit and receiver unit is not required.

In a further embodiment the detection system also comprises an object weighing unit. The weighing unit can detect if the object is in an empty or charged state. In such configuration, the HMI will receive not only the standard information about the movement of the lifting device, but also about the weight of the object and about the alignment of the lifting hook with the object. As such, the HMI can provide a complete picture of the ongoing operations in the plant.

In another aspect of the invention there is provided a detection system for a lifting system, comprising a magnet, a sensor unit, a transmitter unit and a receiver unit. Such a system can be installed on existing lifting systems as an aftermarket solution. The magnet, sensor unit and transmitter unit are not particularly limited, but should preferably be able to withstand harsh conditions common in a metallurgical plant, such as elevated temperatures, dusty environment and shock impact. The sensor unit may comprise a hall effect sensor or a reed switch. The sensor unit and transmitter unit are preferably 20 operating on a battery, such that the system does not require a power cable.

In an embodiment of the invention the magnet is a permanent magnet, such that it creates its own persistent magnetic field. This is preferred as no electrical current is needed to operate the magnet.

The strength of the magnet and the sensitivity of the sensor unit both determine the distance wherein a signal will be submitted. In an embodiment according to the invention, the magnet has a remanence of at least 3000 Gauss. At a remanence of at least 3000 Gauss, the sensor unit can be activated at a minimum distance of 0 mm and a maximum distance of 500 mm and will be deactivated when the magnet and sensor are more than 100 mm misaligned. In this range there is sufficient room to mount the sensor unit and transmitter unit on the hook and the magnet on the object while maintaining a good threshold for the sensor unit.

In an embodiment according to the invention, the distance between the magnet and sensor unit upon correct alignment is at most 200 mm. At a distance over 200 mm the size and/or the remanence of the magnet needs to be increased, which makes the placement of the magnet more difficult and will result in a system which is less accurate.

In an embodiment according to the invention, the threshold for a submission of the signal to the receiver unit is at least 2 milliTesla Below 2 milliTesla, the fitting of the magnet, sensor unit and transmitter unit to the object and lifting device becomes less practical as they need to be placed closer to the location where the hook and trunnion engage. In addition, this will increase the shock load implied on the detection system, which might result in damage to the system.

In a preferred embodiment each sensor unit comprises at least two sensors, the transmitter unit comprises at least two transmitters and the receiver unit comprises at least two receivers. Both at the transmitter and the receiver the signal is compared. If a signal is only received by one of the transmitters and/or receivers, the system will be able to provide a warning. By using such a lay out, the detection system is failsafe, making the system extra robust.

In an embodiment the transmitter unit and receiver unit are wirelessly connected. The signal are preferably submitted via radio waves, e.g. wlan, such that a cable between the transmitter unit and receiver unit is not required.

In a further embodiment the detection system also comprises an object weighing unit. The weighing unit can detect if the object is in an empty or charged state and may be used to signal a safe situation wherein the hook and trunnion are not aligned.

BRIEF DESCRIPTION OF THE DRAWINGS

FIGS. 1A-1C show the invention in various views. FIG. 1A shows the invention relative to the object 10. FIG. 1B shows the invention in correct alignment. FIG. 1C shows the invention not correctly aligned.

The invention is further explained by the non-limiting example shown in FIG. 1.

FIG. 1A shows object 10, which is a hot metal ladle (partially shown), comprising two trunnions 15, 15'. Adjacent of the trunnions permanent magnets 1, 1' (not shown) are installed. Both magnets are ferrite magnets with a remanence of 4000 Gauss, with a size of 150×100×50 mm. At the inner side of each hook 20, 20' a sensor unit 2, 2' is installed. The sensor units have a unipolar hall sensor that will be activated at a distance between 0 and 178 mm and deactivated at a distance larger than 428 mm or a misalignment of 100 mm. The threshold of the sensor unit is 3 milliTesla. The transmitter unit 3, comprising a microprocessor is mounted to the outer side of the hook. The transmitter unit 3 and sensor unit are connected by a cable and charged with a battery. In FIG. 1B the hook and trunnion are in a correct alignment, leading to a positive wireless feedback signal from the transmitter unit to the receiver unit 4. In FIG. 1C, the hook and trunnion are not correctly aligned, if the system would start lifting, dangerous situation might arise. However, due to the faulty alignment of the hook and trunnion, the magnet will not set of the sensor unit and will be below the threshold. As such, no positive feedback signal will be submitted to the receiver unit and a warning message will be displayed on the HMI.

The invention claimed is:

1. A lifting system for a metallurgical plant comprising an object with one or more trunnions and a lifting device with one or more lifting hooks for receiving the trunnions, wherein the lifting system further comprises a detection system, the detection system comprising a receiver unit, a sensor unit, a magnet and a transmitter unit, and wherein the magnet is a permanent magnet, and wherein the magnet and the sensor unit are aligned upon correct alignment of at least one lifting hook and one trunnion such that a signal is submitted to the receiver unit.

2. The lifting system according to claim 1, wherein the object comprises a pair of trunnions and the lifting device comprises a pair of lifting hooks.

3. The lifting system according to claim 2, wherein the object is a hot metal ladle.

4. The lifting system according to claim 2, wherein the magnet is a permanent magnet.

5. The lifting system according to claim 2, wherein the magnet has a remanence of at least 3000 Gauss.

6. The lifting system according to claim 2, wherein the magnet is mounted at an outer side of the object.

7. The lifting system according to claim 1, wherein the magnet has a remanence of at least 3000 Gauss.

8. The lifting system according to claim 1, wherein the magnet is mounted at an outer side of the object.

9. The lifting system according to claim 1, wherein the object comprises the magnet adjacent to each trunnion.

10. The lifting system according to claim 1, wherein the distance between the magnet and sensor unit upon correct alignment is at most 200 mm.

11. The lifting system according to claim 1, wherein the threshold of the sensor unit is at least 2 milliTesla.

12. The lifting system according to claim 1, wherein the sensor unit is arranged at the inside of the hook.

13. The lifting system according to claim 1, wherein the transmitter unit is arranged at the outside of the hook.

14. The lifting system according to claim 1, wherein each lifting hook comprises the sensor unit and the transmitter unit and wherein the object comprises the magnet for said each trunnion.

15. The lifting system according to claim 1, wherein the transmitter unit and the receiver are wirelessly connected.

16. The lifting system according to claim 1, wherein each sensor unit comprises at least one hall sensor.

17. The detection system for the lifting system, comprising the magnet, the sensor unit, the transmitter unit and the receiver unit according to claim 1.

\* \* \* \* \*